United States Patent
Litman et al.

(10) Patent No.: US 12,214,509 B2
(45) Date of Patent: Feb. 4, 2025

(54) ROBOT SYSTEM TO PERFORM COORDINATED BODY WORK

(71) Applicant: Aescape, Inc., New York, NY (US)

(72) Inventors: Eric A. Litman, Brooklyn, NY (US); Nicholas Akiona, New York, NY (US); Jonathan Herman, Scarsdale, NY (US); Chris Casey, Lexington, MA (US)

(73) Assignee: Aescape, Inc., New York, NY (US)

( * ) Notice: Subject to any disclaimer, the term of this patent is extended or adjusted under 35 U.S.C. 154(b) by 0 days.

(21) Appl. No.: 18/184,825

(22) Filed: Mar. 16, 2023

(65) Prior Publication Data

US 2024/0308074 A1   Sep. 19, 2024

(51) Int. Cl.
*B25J 9/16* (2006.01)
*A61H 7/00* (2006.01)
(Continued)

(52) U.S. Cl.
CPC ............ *B25J 9/1682* (2013.01); *A61H 7/004* (2013.01); *A61H 15/0078* (2013.01);
(Continued)

(58) Field of Classification Search
CPC ................... A61H 7/004; A61H 39/02; A61H 2201/5002; A61H 2201/5035;
(Continued)

(56) References Cited

U.S. PATENT DOCUMENTS

| 11,285,074 B2 | 3/2022 | Qiu |
| 11,338,443 B2 | 5/2022 | Eyssautier |

(Continued)

FOREIGN PATENT DOCUMENTS

| CN | 115870952 | 3/2023 |
| CN | 115972202 | 4/2023 |

OTHER PUBLICATIONS

"Compression Stretch Massage Techniques (51 Minutes)", uploaded by MassageNerd on YouTube, dated Jun. 11, 2011, https://www.youtube.com/watch?v=YQEOtouQkRk (Year: 2011).*

(Continued)

*Primary Examiner* — Colin W Stuart
*Assistant Examiner* — Douglas Y Sul
(74) *Attorney, Agent, or Firm* — Van Pelt, Yi & James LLP

(57) ABSTRACT

A system includes a first robotic arm and a second robotic arm, each coupled to a support structure configured to support an object. The first robotic arm includes a first end effector having a first shape, and the second robotic arm is separate from the first robotic arm and includes a second end effector having a second shape that mirrors the first shape when observed from a common perspective. The first end effector and/or the second end effector is asymmetric about at least one two-dimensional plane of that is perpendicular to an end effector plane of the at least one of the first end effector or the second end effector. At least one processor is operatively coupled to the first robotic arm and the second robotic arm, and configured to perform coordinated body work on the object using the first robotic arm and the second robotic arm.

28 Claims, 9 Drawing Sheets

(51) Int. Cl.
*A61H 15/00* (2006.01)
*B25J 11/00* (2006.01)
*B25J 15/00* (2006.01)

(52) U.S. Cl.
CPC .......... *B25J 9/1633* (2013.01); *B25J 9/1669* (2013.01); *B25J 11/008* (2013.01); *B25J 15/0019* (2013.01); *A61H 2201/1659* (2013.01); *A61H 2201/5002* (2013.01); *A61H 2201/5007* (2013.01); *A61H 2201/5035* (2013.01)

(58) Field of Classification Search
CPC ..... A61H 2201/5007; A61H 2201/1659; B25J 9/1682; B25J 9/1633; B25J 11/008; B25J 15/0019
See application file for complete search history.

(56) References Cited

U.S. PATENT DOCUMENTS

| | | | | |
|---|---|---|---|---|
| 2001/0014781 A1* | 8/2001 | Nissim | ................... | A61H 7/001 601/84 |
| 2013/0106128 A1 | 5/2013 | Yamasaki | | |
| 2014/0378878 A1 | 12/2014 | Sharma | | |
| 2016/0175185 A1 | 6/2016 | Buchner Santos | | |
| 2017/0079871 A1* | 3/2017 | Zhang | ................... | G16H 40/63 |
| 2017/0105895 A1 | 4/2017 | Sardinas | | |
| 2017/0266077 A1* | 9/2017 | Mackin | ............... | A61G 13/1235 |
| 2019/0160684 A1* | 5/2019 | Gu | ......................... | B25J 13/087 |
| 2019/0184574 A1* | 6/2019 | Chen | .................... | A61G 15/007 |
| 2020/0108497 A1 | 4/2020 | Miyazaki | | |
| 2020/0126297 A1* | 4/2020 | Tian | ......................... | G06T 7/55 |
| 2020/0155410 A1 | 5/2020 | Smith, Jr. | | |
| 2020/0276719 A1 | 9/2020 | Buind | | |
| 2022/0234210 A1* | 7/2022 | Inada | .................... | B25J 11/008 |
| 2022/0313536 A1 | 10/2022 | Cooper | | |
| 2022/0336080 A1* | 10/2022 | Monteverde | .............. | G06T 7/70 |
| 2022/0414291 A1 | 12/2022 | Eyssautier | | |

OTHER PUBLICATIONS

"Deep Tissue Massage Technique: The 'Mother Hand'", uploaded by Massage Sloth on YouTube, dated Apr. 26, 2017, https://www.youtube.com/watch?v=i9dUy8dGb-0&t (Year: 2017).*

Wang et al. "Constraint-based Correspondence Matching for Stereo-based Interactive Robotic Massage Machine". J Intell Robot Syst (2013) 72:179-196 (Year: 2013).*

* cited by examiner

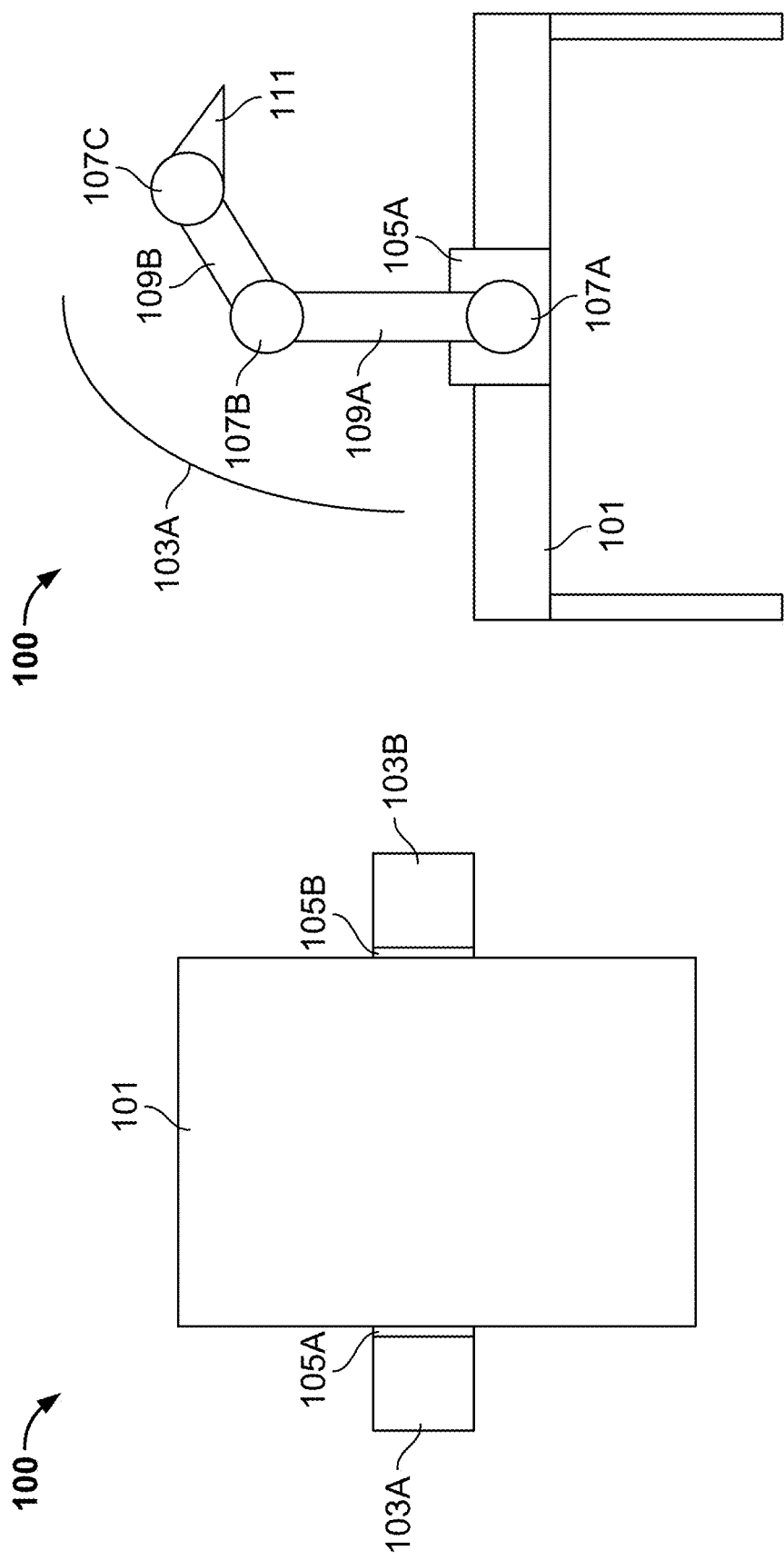

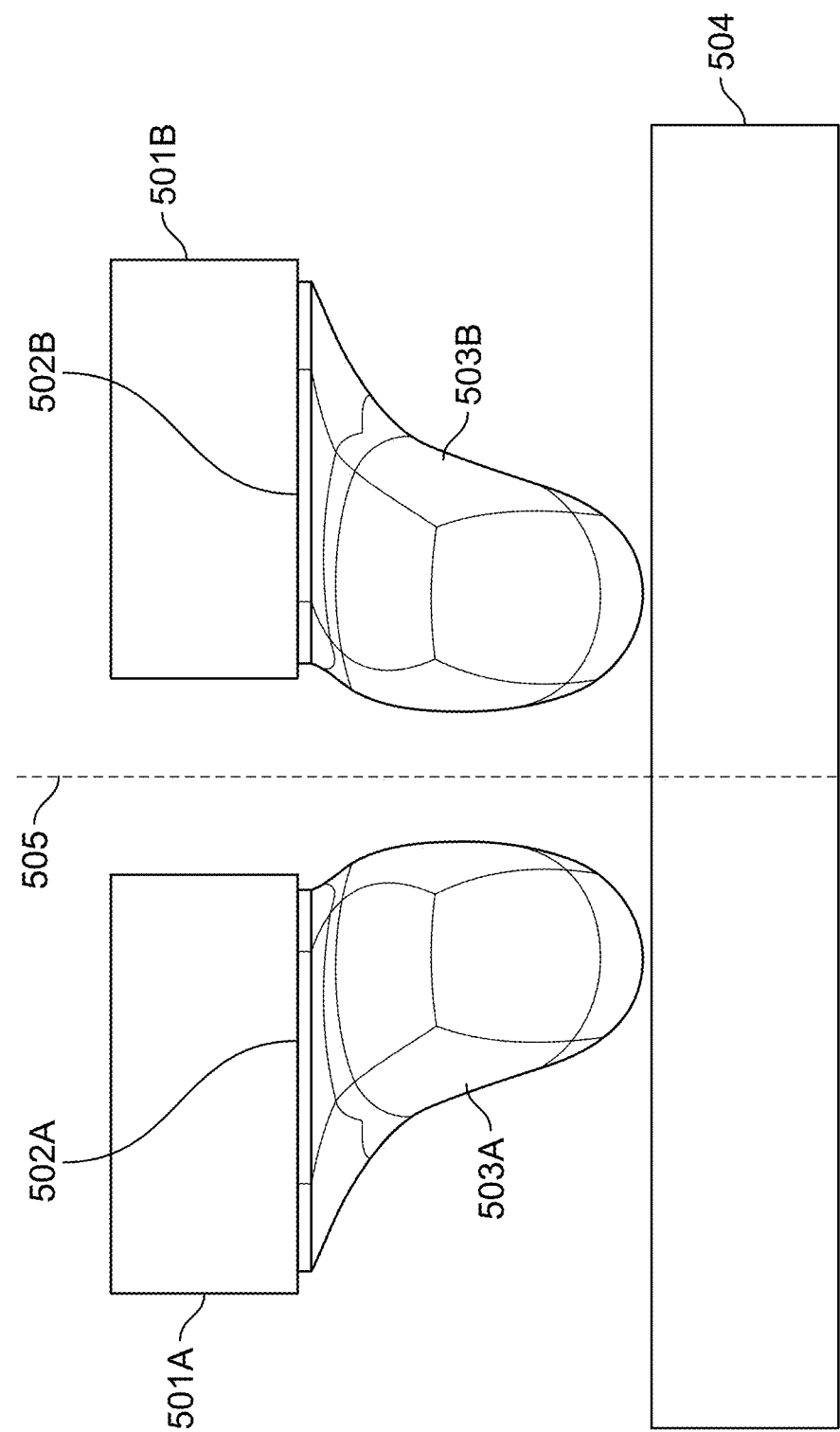

ROBOT SYSTEM TO PERFORM COORDINATED BODY WORK

FIELD

One or more embodiments are related to a robot system with at least one robotic arm to perform coordinated body work, according to an embodiment.

BACKGROUND

Massages that can be performed by robots and without humans can be desirable in some instances. Known systems, however, can use complex movements and coordination to ensure that a high-quality massage is being performed. As such, known robot systems suffer from a limited set of performable massage techniques.

SUMMARY

In an embodiment, an apparatus includes a support structure configured to support an object. The apparatus further includes a first robotic arm coupled to the support structure. The first robotic arm includes a first end effector having a first shape. The apparatus further includes a second robotic arm coupled to the support structure. The second robotic arm is separate from the first robotic arm and has a second shape that mirrors the first shape when observed from a common perspective. At least one of the first end effector or the second end effector is asymmetric about at least one two-dimensional plane that is perpendicular to an end effector plane of the at least one of the first end effector or the second end effector. The apparatus further includes at least one processor operatively coupled to the first robotic arm and the second robotic arm. The at least one processor is configured to perform coordinated body work on the object using the first robotic arm and the second robotic arm.

In an embodiment, a non-transitory, processor-readable medium stores code representing instructions executable by a processor to receive a signal representing an instruction to perform a massage. The non-transitory, processor-readable medium further stores code to send at least one signal to cause at least one of a first robotic arm of a robot system or a second robotic arm of the robot system to perform the massage on an object. The robot system includes a support structure. The robot system further includes the first robotic arm. The first robotic arm is coupled to the support structure and includes a first end effector with a first shape. The robot system further includes a second robotic arm coupled to the support structure. The second robotic arm is separate from the first robotic arm and includes a second end effector having a second shape that mirrors the first shape when observed from a common perspective. At least one of the first end effector or the second end effector is asymmetric about at least one two-dimensional that is perpendicular to an end effector plane of the at least one of the first end effector or the second end effector.

In an embodiment, a method includes receiving, via at least one processor of a robotic system, a signal representing an instruction to perform a massage. The method further includes sending, via the at least one processor, at least one signal to cause a robotic arm of the robot system to perform the massage on an object. The robot system includes a support structure and the robotic arm. The robotic arm is coupled to the support structure and includes an end effector that is asymmetric about at least one two-dimensional plane that is perpendicular to an end effector plane of the end effector.

BRIEF DESCRIPTION OF THE DRAWINGS

FIGS. 1A-1B show top and side views, respectively, of a robot system that can be used to perform a massage, according to an embodiment.

FIG. 5 shows end effectors coupled to links of robotic arms via end effector flanges, according to an embodiment.

DETAILED DESCRIPTION

Figure 2A:
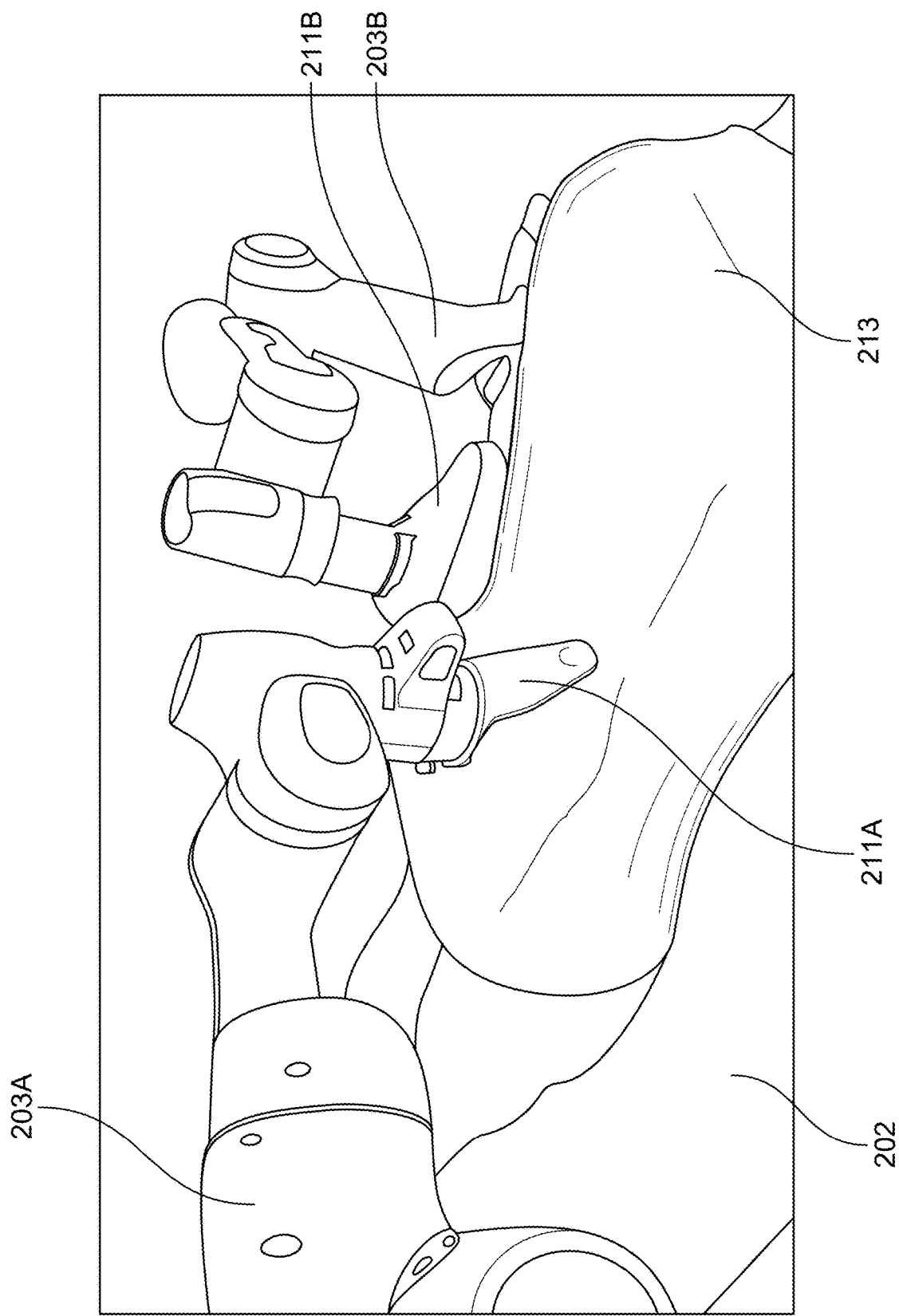
FIGS. 2A-2B show example illustrations of portions of a robot system including two robotic arms, according to an embodiment.

In some implementations, a robot system can be used to perform coordinated body work. In some instances, coordinated body work refers to rubbing, tapping, kneading, and/or the like a body (e.g., human, animal, etc.) in a coordinated fashion (e.g., a massage). The robot system can include a support structure for an object, such as a support structure for a human, animal, mechanical device, and/or the like to lay. The robot system can also include any number (e.g., one, two, three, four, etc.) of robotic arms (e.g., coupled to the support structure) for performing the coordinated body work on the object. The robotic arms can each include an end effector that makes contact with the object to perform the coordinated body work. The robotic arms can perform any type of coordinated body work, such as an effleurage, petrissage, friction, tapotement, vibration, and/or the like.

FIGS. 1A and 1B show top and side views, respectively, of a robot system 100 that can be used to perform a massage, according to an embodiment. FIG. 1A shows a support structure 101, couplers 105A, 105B, and robotic arms 103A, 103B. The support structure can support an object, such as a human, animal, and/or the like. In some instances, the support structure is a bed (e.g., a massage bed), table, or other suitable platform.

The robotic arms 103A and 103B are each coupled to the support structure 101 via couplers 105A and 105B, respectively. In some instances, robotic arm 103A is separate (e.g., physically separate) from robotic arm 103B. For example, robotic arm 103A is coupled to a first side (e.g., left side) of support structure 101, and robotic arm 103B is coupled to a second side (e.g., right side) of support structure 101 that is different than the first side.

As shown in FIG. 1B, the robotic arm 103A includes an end effector 111, links 109A, 109B, and joints 107A, 107B, 107C. Joints 107A, 107B, and 107C act as pivot points for the robotic arm 103A. One or more of the joints 107A, 107B, 107C can include one or more brakes. In some implementations, when a brake is enabled, the joint for that brake will be locked/will not pivot or otherwise be repositioned (e.g., electronically and/or mechanically prevented from moving in one or more ways), and when the brake is disabled, the joint for that brake will be unlocked/able to pivot or to otherwise be repositioned. In some implementations, when a brake is enabled, the joint for that brake will not be locked/will pivot or otherwise be repositioned, and when the brake is disabled, the joint for that brake will be locked/not able to pivot or otherwise be repositioned. The joints 107A, 107B, 107C can be configured to allow for rotary movement around any number of axes (e.g., one, two, three, etc.).

The joints 107A, 107B, and 107C are interconnected via the links 109A, 109B. Joint 107A is coupled to coupler 105A, and joint 107C is coupled to end effector 111 (e.g., via an attachment not shown in FIGS. 1A and 1B). Together, the joints 107A, 107B, 107C and links 109A, 109B enable the end effector 111 to make contact with an object and perform coordinated work.

The end effector 111 can be any type of end effector, such as a gripper, a roller, a suction cup, a powered tool, a massage tool, and/or the like. In some implementations, an end effector refers to an implement sized, shaped, and engineered to contact a body with a desired force, touch feel, and/or the like. In some implementations, the end effector 111 is shaped for performing a massage technique, such as pinning, rolling, stretching, grabbing, gliding, kneading, and/or the like. In some instances, the end effector 111 has an irregular shape and/or is asymmetric about at least one two-dimensional plane (e.g., an end effector plane, a two-dimensional plane that passes through a center of at least one mounting flange of the end effector 111, etc.) of the end effector 111. In some instances, the end effector 111 is asymmetric about one or more two-dimensional planes from a plurality of two-dimensional planes intersecting the end effector 111.

Although not shown in FIG. 1B, robotic arm 103B can have a structure similar to that of robotic arm 103A. For example, robotic arm 103B can include a plurality of joints interconnected with a plurality of brakes (e.g., similar to joints 107A, 107B, 107C and links 109A, 109B), and an end effector (e.g., similar to end effector 111). In some instances, robotic arms 103A and 103B have substantially the same end effector (accounting for slight variations that can occur due to manufacturing and use).

Although FIG. 1B shows robotic arm 103A as including three joints and two links, in other implementations, any number of joints and links can be used (e.g., six joints and five links, seven joints and six links, etc.). Additional details related to a robotic device that can be used to implement one or more coordinated body works discussed herein are discussed in U.S. patent application Ser. No. 17/959,777, filed Oct. 4, 2022 and titled "METHOD AND SYSTEM FOR ELECTROMECHANICAL SAFETY FOR ROBOTIC MANIPULATORS," the contents of which are incorporated herein by reference in their entirety.

Although not shown in FIGS. 1A and 1B, in some instances, the robot system 100 includes a fixed base. The fixed base can be fixed, permanently attached, or removably attached to a base structure, support structure, massage table, floor, wall, ceiling, movable carriage, or other structure. The fixed base can be attached to a rail system, block, or other structure movably attached to a rail/translation system, allowing the robot system 100 to be moved along the side of a table, chair, wall, floor, or other structure.

Although not shown in FIGS. 1A and 1B, in some instances, the support structure 101 includes at least one track. Coupler 105A, coupler 105B, robotic arm 103A and/or robotic arm 103B can be coupled to the at least one track, allowing coupler 105A, coupler 105B, robotic arm 103A and/or robotic arm 103B to slide along support structure 101. In some instances, the support structure 101 includes a first track along a first side (e.g., left side) of the support structure 101 and a second track along a second side (e.g., right side) of the support structure 101. For example, robotic arm 103A and/or coupler 105A can be attached to the first track, enabling robotic arm 103A and/or coupler 105A to slide along the first track, and robotic arm 103B and/or coupler 105B can be attached to the second track, enabling robotic arm 103B and/or coupler 105B to slide along the second track. In some instances, the first track is not mechanically connected to the second track, enabling each of the robotics arms 103A and 103B to operate independently. In some instances, the first rack is mechanically connected to the second track.

Although not shown in FIGS. 1A and 1B, the robot system 100 can include a processor. The processor can be, for example, a hardware based integrated circuit (IC) or any other suitable processing device configured to run and/or execute a set of instructions or code. For example, the processor can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor can be configured to execute, perform, or cause performance of any of the methods and/or portions of methods discussed herein. The processor can be housed at any one or more components of the robot system 100, or somewhere different than the robot system 100. Signals sent by the processor can be communicated to one or more components of the robot system 100 (e.g., via a system bus), such as robotic arm 103A, robotic arm 103B, a joint, and link, and/or the like. In some instances, the processor is communicably coupled (e.g., via one or more wired and/or wireless networks) to robotic arm 103A and/or 103B.

Although not shown in FIGS. 1A and 1B, the robot system 100 can include a memory. The memory can be, for example, a random-access memory (RAM), a memory buffer, a hard drive, a read-only memory (ROM), an erasable programmable read-only memory (EPROM), and/or the like. The memory can be configured to store data used by the processor to perform the techniques discussed herein. In some instances, the memory can store, for example, one or more software programs and/or code that can include instructions to cause the processor to perform one or more processes, functions, and/or the like. In some embodiments, the memory can include extendible storage units that can be added and used incrementally. In some implementations, the memory can be a portable memory (for example, a flash drive, a portable hard disk, and/or the like) that can be operatively coupled to the controller. In some instances, the memory can be remotely operatively coupled with the robot system 100. For example, a remote database device (not shown in FIGS. 1A and 1B) can serve as a memory and be operatively coupled to the robot system 100. The memory is operatively coupled to the processor.

Figure 2B:
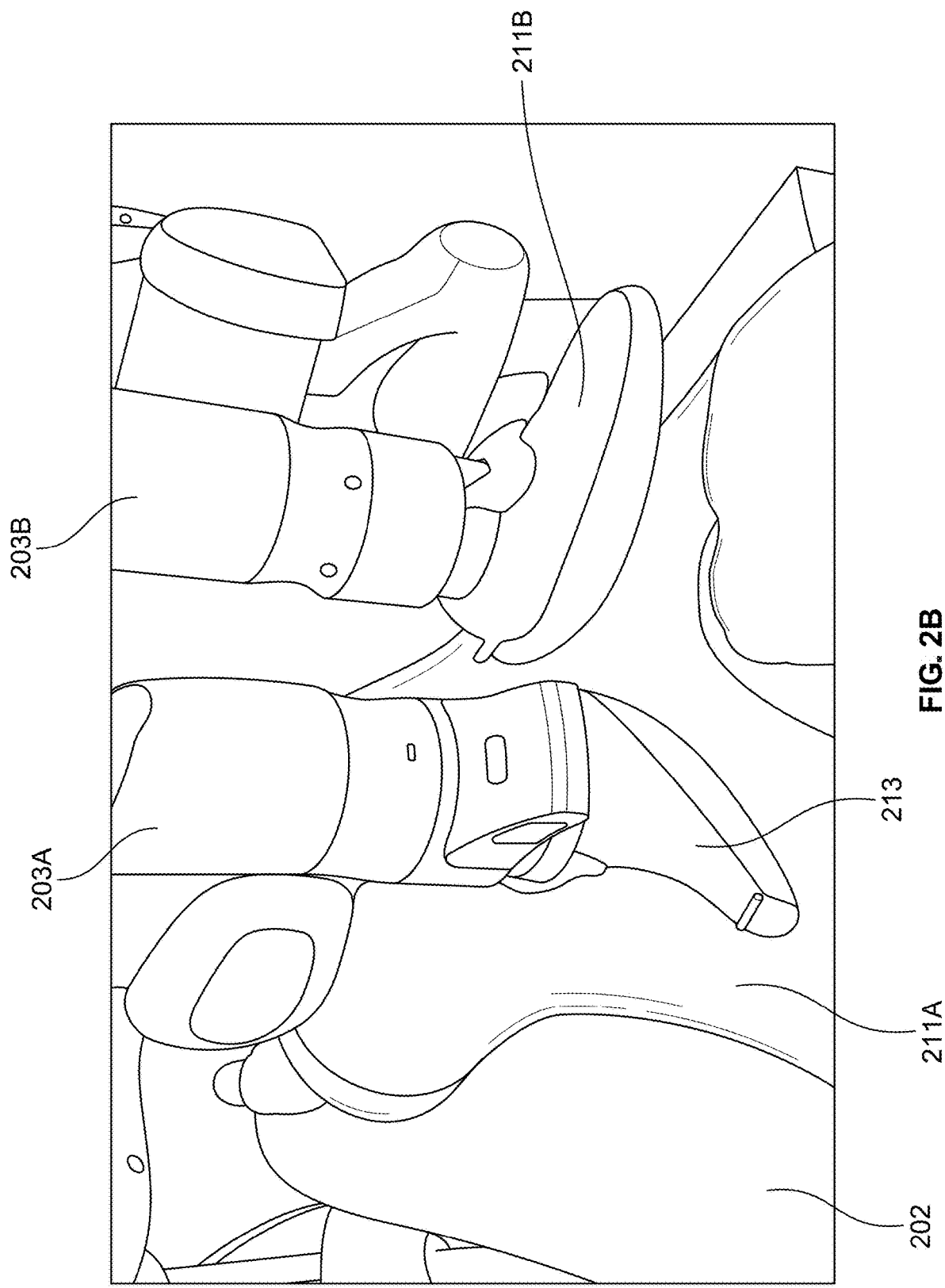

FIGS. 2A and 2B show example illustrations of portions of a robot system including two robotic arms, according to an embodiment. FIGS. 2A and 2B include robotics arms 203A and 203B. The robotic arms 203A and 203B include end effectors 211A and 211B, respectively, that can make contact with an object 213 on a support structure 202 to perform a massage.

Figure 3A:
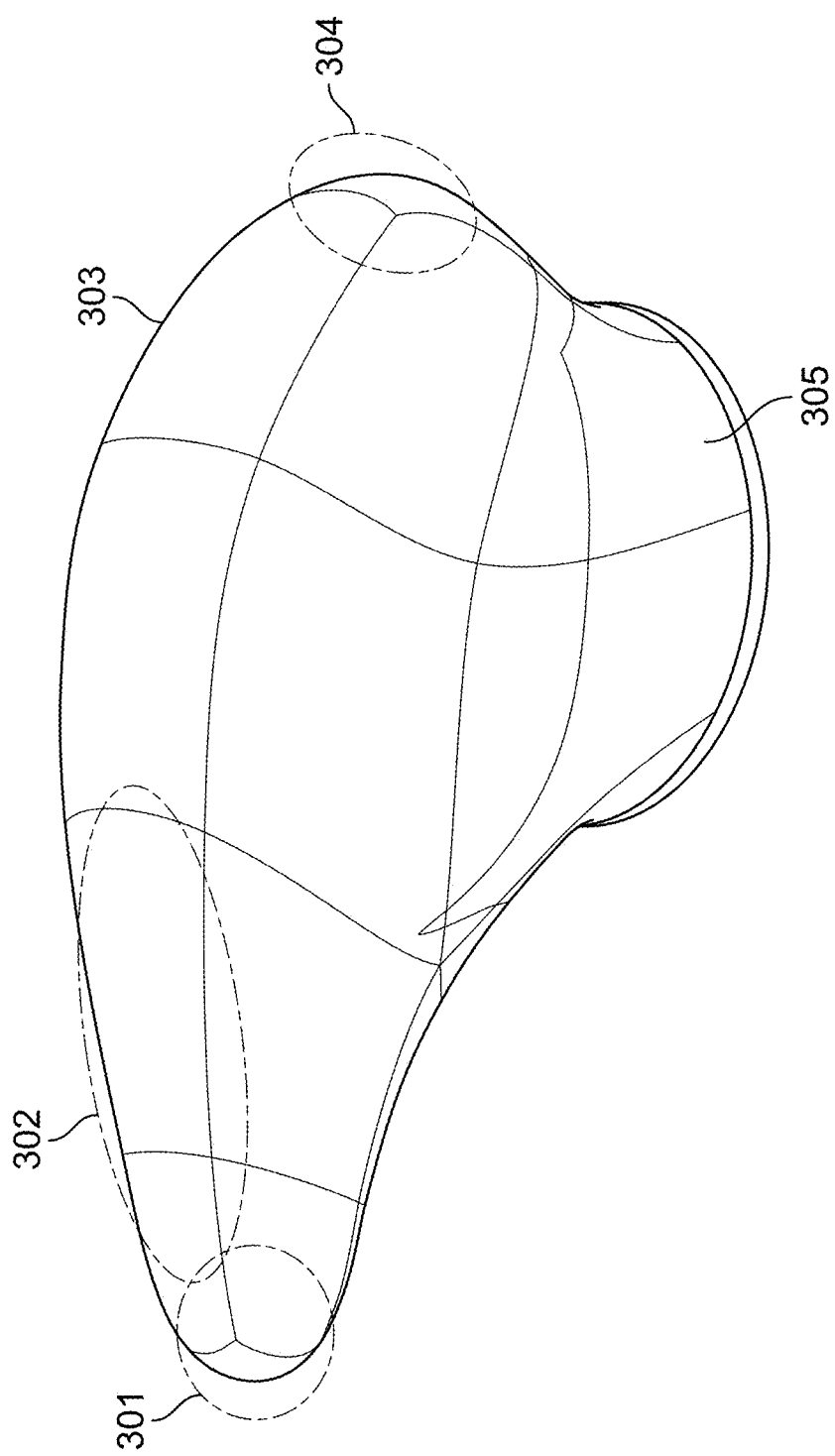
FIGS. 3A-3C show various perspective views of an end effector, according to an embodiment.
Figure 3B:
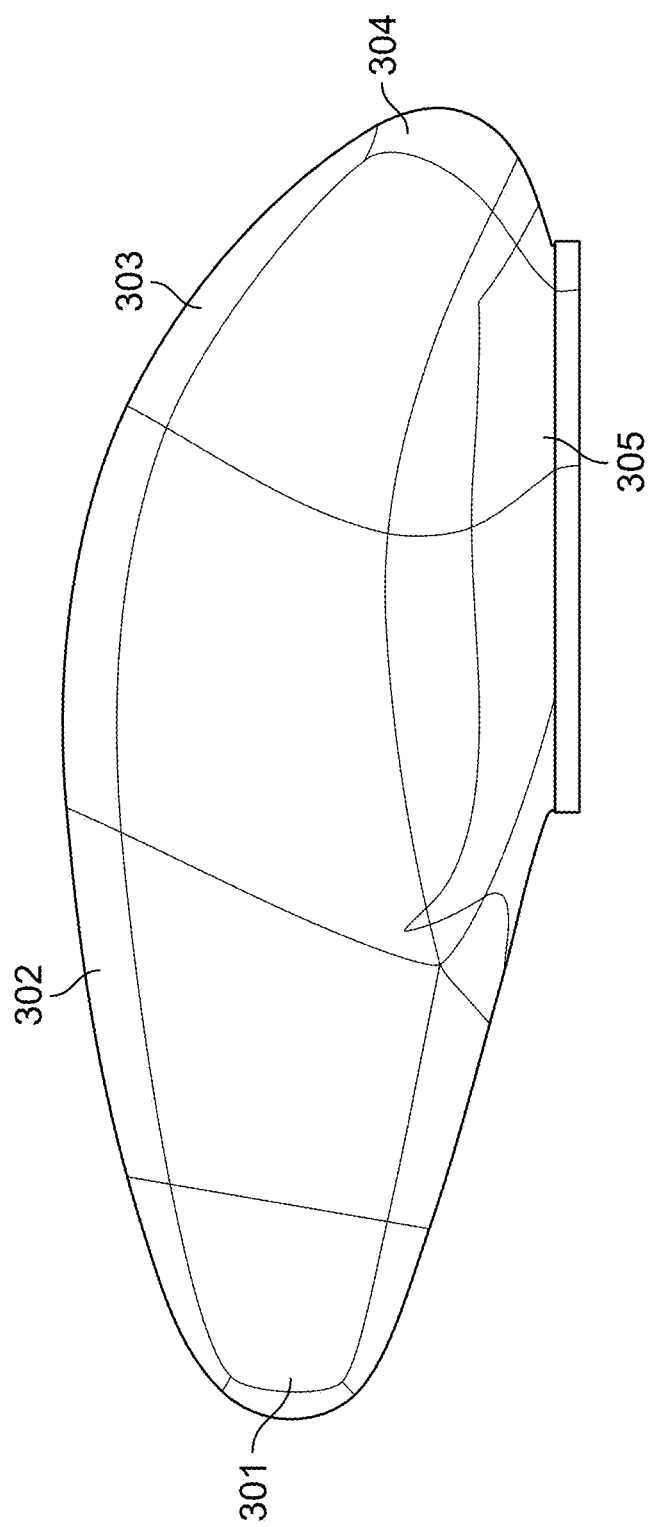
Figure 3C:
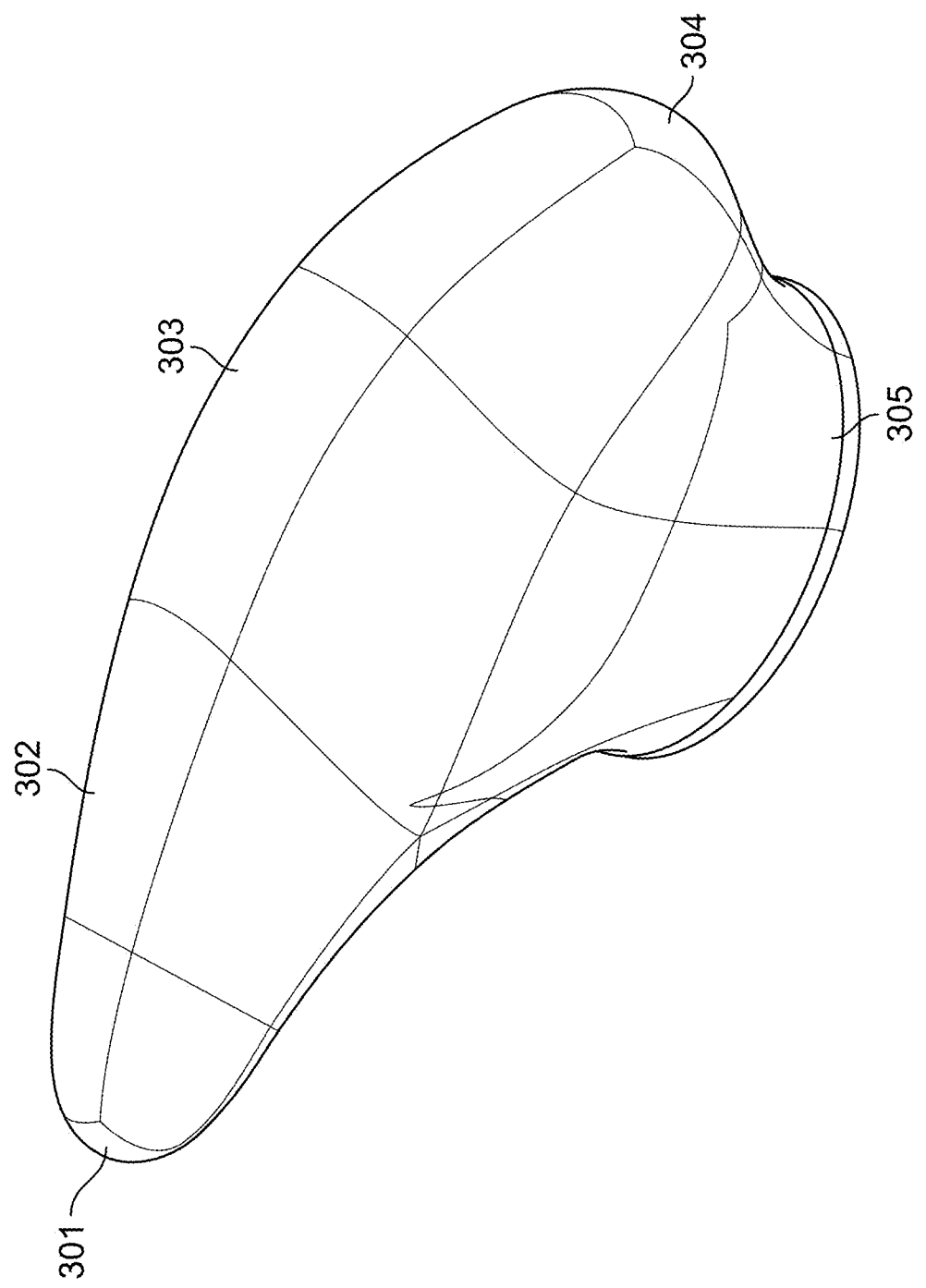

FIGS. 3A-3C show various perspective views of an end effector (e.g., end effector 111), according to an embodiment. The end effector can include multiple different contact surfaces that are distinct from one another, and that can be used for different purposes/modalities. These contact surfaces can have various shapes and/or properties, e.g., for applying different pressures to an object during coordinated body work. For example, as shown in each of the different views from FIGS. 3A-3C, the end effector can include a portion 301 having a first contact surface (e.g., for focused work), a portion 302 having a second contact surface (e.g., for stripping) different from the first contact surface, a portion 303 having a third contact surface (e.g., for compressions and/or effleurage) different from the first and second contact surfaces, and a portion 304 having a fourth contact surface (e.g., for high force stripping) different from the first, second, and third contact surfaces. The end effector can also include an end effector flange 305 (e.g., to function as coupler for a joint such as joint 107C in FIG. 1B). The end effector can be made of any material, such as rubber, plastic, silicone, nitrile, vinyl, neoprene, and/or the like.

As used herein, an end effector "having a shape" can refer to the end effector having a shape that is substantially consistent/uniform across at least a portion thereof, and does not necessarily refer to an overall shape of the end effector as a whole. In other words, the end effector, in some embodiments. may be said to "have" multiple different shapes, each shape being associated with a different portion of the end effector. In other embodiments, an end effector can have a substantially consistent/uniform shape globally (e.g., the end effector may have an overall oval shape, an overall ellipsoid shape, etc.).

Figure 4:
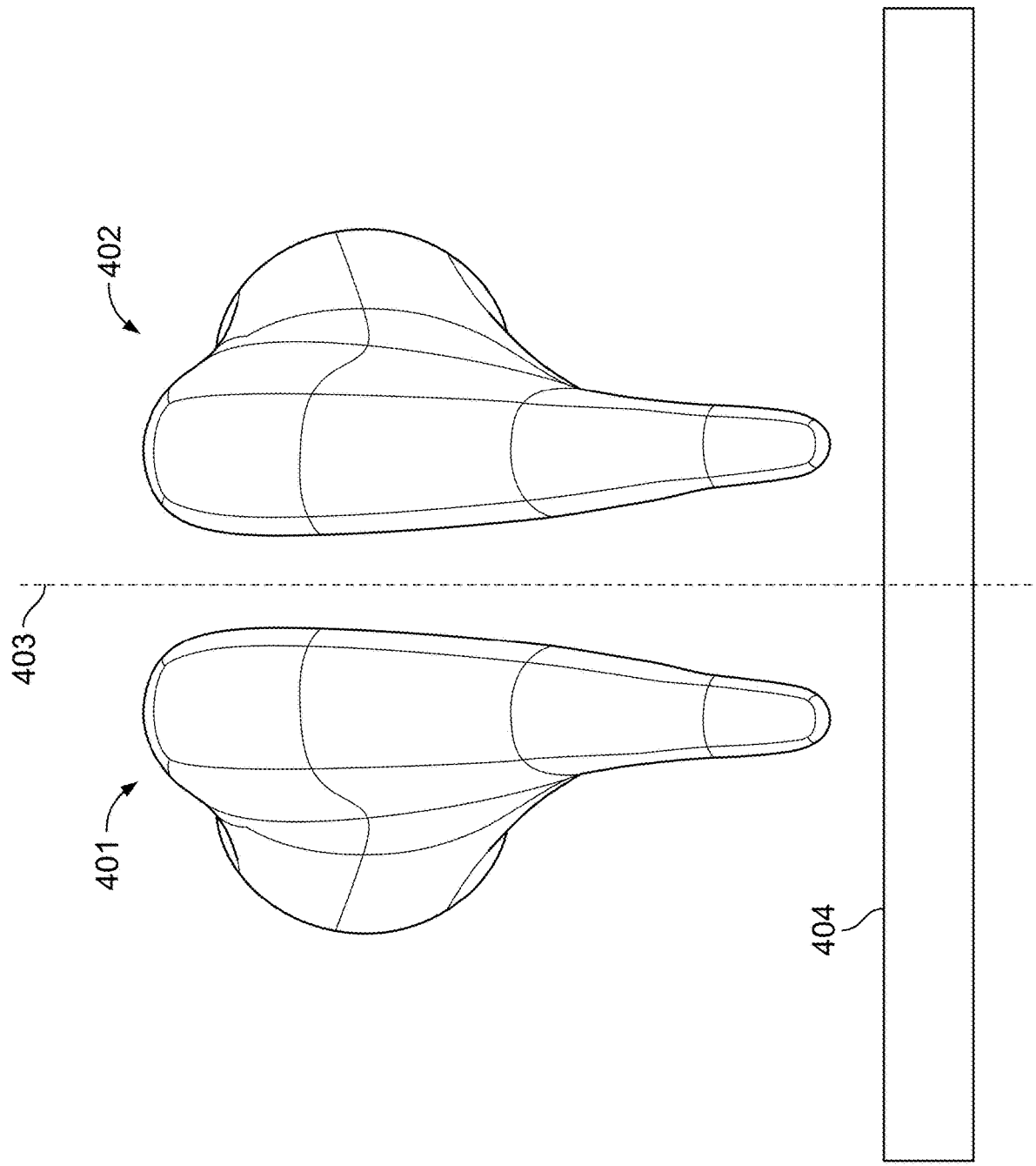
FIG. 4 shows end effectors mirrored across a plane perpendicular to a table, according to an embodiment.

In some implementations, an end effector of a first robotic arm (e.g., robotic arm 103A) and an end effector of a second robotic arm (e.g., robotic arm 103B) are mirrored across a plane, such as a plane perpendicular to a support structure (e.g., support structure 101). For example, FIG. 4 shows end effector 401 and end effector 402 mirrored across a plane 403 perpendicular to a table 404, according to an embodiment.

In some implementations, mirrored, asymmetrical end effectors allow for the close symmetrical contact between the left and right sides of an object without them or the robot arms they are mounted on colliding. For example, FIG. 5 shows an end effector 503A coupled to the last link 501A of a robotic arm via an end effector flange 502A, and an end effector 503B coupled to the last link 501B of a robotic arm via an end effector flange 502B. In some implementations, the end effectors 503A, 503B can be mirrored across a plane 505 perpendicular to a structure 504 (e.g., a body that is being massaged and/or a table or other support structure).

Figure 6B:
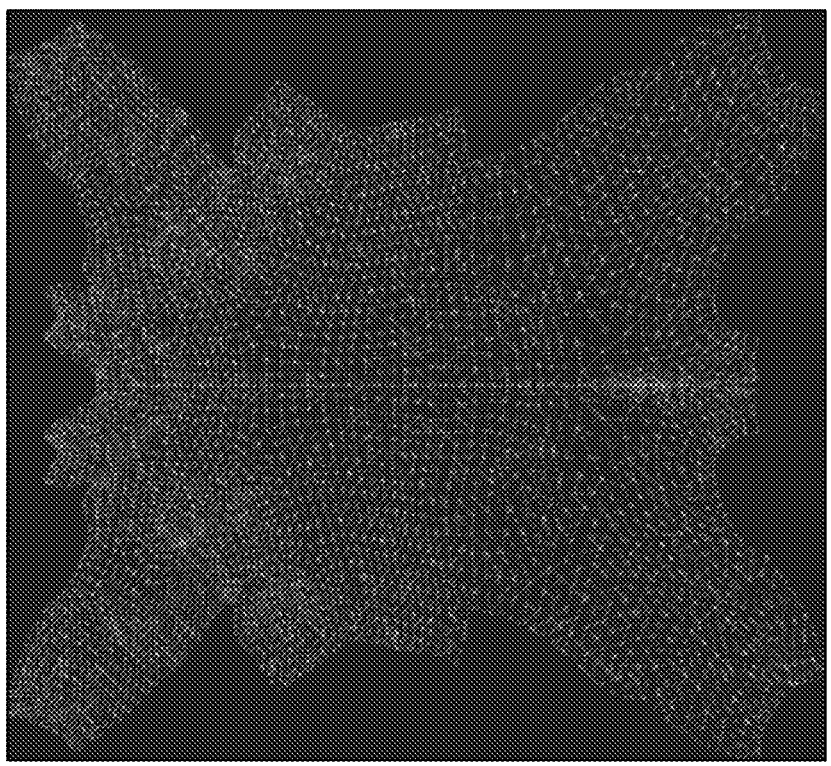
FIGS. 6A-6B shows an example of a three-dimensional (3D) structural representation of a human body, and a two-dimensional (2D) texture map of the human body, respectively, according to an embodiment.
Figure 6A:
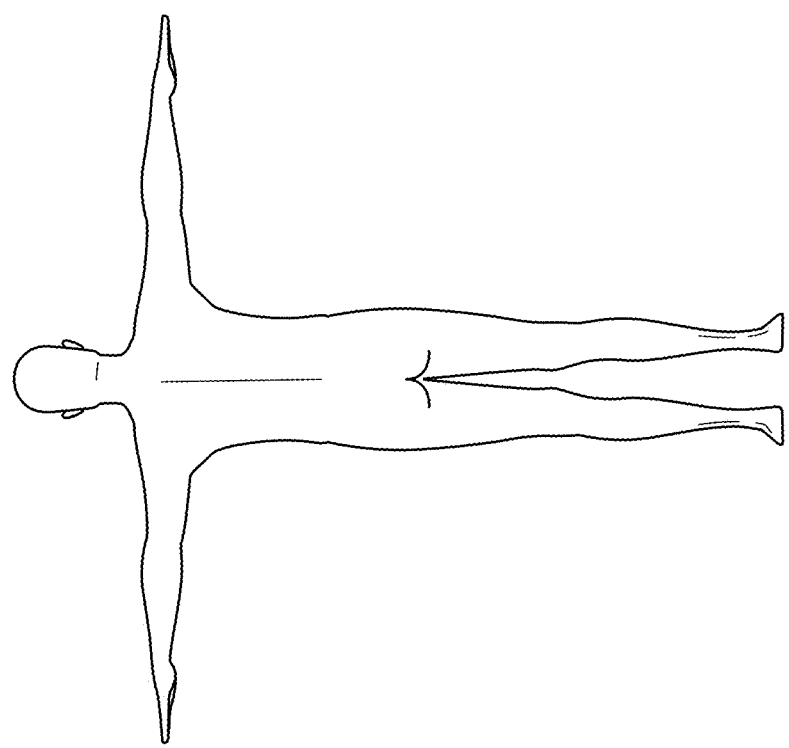

In some implementations, stokes (e.g., of end effectors) can be mirrored using a two-dimensional (2D) texture map or a representation of a three-dimensional (3D) surface (e.g., of a human body). FIG. 6A shows an example of a 3D structural representation of a human body, and FIG. 6B shows a 2D texture map of the human body. In some instances, the 3D structural representation can be captured using, for example, a body scan. In some implementations, the 2D texture map can be generated based on the 3D structural representation. For example, the 3D structural representation can be mesh unwrapped into UV space, allowing for mirroring directly related to the surface of the skin, and the spine and/or center of the body can be represented in the 2D texture map and/or in the 3D structural representation (e.g., using a line, spline, and/or the like), to facilitate mirroring between, for example, the left and right sides of the body. Note, however, that mirroring can occur around/about any arbitrary line or curve in UV space or any coordinate frame or plane in cartesian space. In some instances, symmetrical and/or mirrored strokes can be performed by multiple end effectors using the 3D structural representation and/or the 2D texture map as a reference frame.

A robot system (e.g., robot system 100) can be used to perform coordinated body work, such as a coordinated massage. Although discussions herein mention massages as an example, other types of coordinated works can also be performed, such as assembling a mechanical device, performing a medical procedure, and/or the like. In some implementations, a processor of the robot system can send an electronic signal (e.g., to robotic arms 103A and/or 103B) to cause a robotic arm(s) (e.g., to robotic arms 103A and/or 103B) to perform the coordinated body work.

Pin and Stretch Technique

In some implementations, the coordinated body work can include a pin and stretch technique. For example, a first end effector of a first robotic arm can pin a first region (e.g., lower back) of a body, and a second end effector of a second robotic can apply a pressure to stretch a second region (e.g., upper back) of the body away from the first region of the body. In some instance, the pin and stretch technique can stretch/elongate a muscle(s) of a body by applying at least two points of contact with forces that includes components acting in opposing directions. The first and second end effectors can be both moving, or one of the first or second end effector can be moving while the other is substantially fixed. In some instances, pin and stretch can be performed using more than two end effectors/points of contact.

In some instances, the first end effector applies pressure on the left glute of a human, and the second end effector applies a pressure on the right upper back (or vice versa) to stretch a muscle(s) and the forces along (versus normal to) the body that are directly in line with a muscle(s). In some instances, the first and second end effectors apply pressure on the same side of the body at two different locations on an erector muscle. The tangential directions of force can largely correspond to opposite directions along the erector muscle.

In some instances, a first end effector engages a relative position on the body to keep an anchor point or muscle taught as the second end effector applies force in the opposing direction. In some instances, the first end effector applies some downward force to the muscle, then moves slightly in a direction opposite the second end effector to help elongate the muscle/body from first end effector.

In some instances, a first end effector of a first robotic arm (e.g., robotic arm 103A) can apply a first pressure to a first location of an object during a predefined period of time, while a second end effector of a second robotic arm (e.g., robotic arm 103B) can apply a second pressure to a second location of the object (e.g., different than the first location) during the predefined period of time such that at least a portion of the first pressure opposes at least a portion of the second pressure within a common plane. In some instances, the first and second end effectors make contact with the object to apply the first and second pressures via a region of the first and second end effector (e.g., region 304 of FIGS. 3A-3C).

Mother Hand Technique

In some implementations, the coordinated body work can include a mother hand technique. In some instances, a first end effector is used to perform therapeutic work on a body, while the second end effector is used to provide a stabilizing and/or calming element. For example, while a first end effector is used to perform a stroke on the body, the second end effector is used to apply some nominal force (e.g., less than the pressure provide by the first end effector at the same time) at a position on the body. The pressure on the body provided by one end effector can be low relative to the pressure on the body provided by the other end effector (e.g., less than, at least 10% less than, at least 25% less than, at least 50% less than, at least 75% less than, at least 90% less than, and/or the like).

In some implementations, a substantially (e.g., within 1%, within 5%, within 10%, etc.) singular force or pressure is provided by the mother hand. In others, the force provided by the mother hand can vary/be pulsating (e.g., periodically, sporadically, in relation to the stroke being performed, etc.). For example, the pressure or force provided by the mother hand can increase while the other end effector/robotic arm is moving and/or returning to the start position of a stroke, similar to how a therapist might be leaning some of his/her weight onto the patient and need to rest more weight on the mother hand when relieving pressure on a retract/return stroke.

In some implementations, the position of the mother hand may also move slightly (e.g., within a singular region and/or less than an inch) over the course of the stroke or during a retract of the other end effector/robotic arm between multiple passes of a stroke. The slight position and force adjustments of the mother hand during a therapeutic stroke can distract the user from some of the more intense work and make them feel more comfortable.

In some instances, a first end effector of a first robotic arm (e.g., robotic arm 103A) can perform a first contacted motion across a first region of an object (e.g., human) while applying a first set of pressures to the object, while a second end effector of a second robotic arm (e.g., robotic arm 103B) can perform a second contacted motion across a second region of the object (e.g., different than the first region) while applying a second set of pressures. Each pressure from the second set of pressures can be greater than an associated co-occurring pressure from the first set of pressures. Said differently, a pressure provided by a portion of the first contacted motion at a time can be less than the pressure provided by the portion of the second contacted motion occurring at the same time. In some instances, the first and second end effectors make contact with the object to apply the first and second sets of pressures via respective regions of the first and second end effector. In some implementations, a contacted motion refers to motion of an end effector during which the end effector is in contact with the object.

Symmetric Technique

In some implementations, the coordinated body work can include a symmetric technique. The symmetric technique allows the same work to be performed on the left and right side of the body at substantially (e.g., within 1 second of each other, within 2 seconds of each other, etc.) the same time. A first end effector can apply a stroke at a first region (e.g., left side) of an object, and the second end effector can apply the stroke at a second region (e.g., right side) of the object at the same time, where the strokes are substantially identical (e.g., +/−20%) in shape/trajectory to one another, and/or mirror each other. In some implementations, the strokes mirror across the spine of a body. In some implementations, the strokes mirror relative to a muscle and/or anatomical landmark.

In some implementations, representations of the trajectories of the first end effector and/or second end effector are stored in barycentric space. In some instances, the mirrored strokes are represented in cartesian coordinates. For example, a plane may be defined using the axis of the spine and a z-axis (e.g., a vertical axis, such as the long axis of a leg of the support structure 101 of FIG. 1B) of the support structure to create a plane, where the strokes are mirrored relative to the plane. The mirrored strokes in cartesian coordinates and then remapped to barycentric coordinates using a body model (e.g., from a body scan) of an object. Alternatively or in addition, strokes can be mirrored in UV space, e.g., based on a two-dimensional (2D) map generated relative to a surface of a body.

In some instances, a first end effector of a first robotic arm (e.g., robotic arm 103A) can perform a first contacted motion across a first region of an object during a predefined period of time, while a second end effector of a second robotic arm (e.g., robotic arm 103B) can perform a second contacted motion across a second region of the object different than the first region of the object. The first contacted motion can substantially (e.g., within 1%, within 5%, within 10%, within 25%, within 50%, and/or the like) mirror the second contacted motion relative to a portion (e.g., spine, muscle, landmark, etc.) of the object. In some instances, the first and second end effectors make contact with the object to perform the first and second contacted motions via a region of the first and second end effector (e.g., region 304 in FIGS. 3A-3C).

Walking Compression Technique

In some implementations, the coordinated body work can include a walking compression technique. The walking compression technique can provide alternating compressions across a region of an object, resembling a walking pattern. For example, the first end effector and second end effector can be used to alternatively provide pressures, where the location of each pressure changes and progresses from a start location (e.g., left side of upper back) to an end location (e.g., right side of lower back). In some implementations, the walking compression technique can be used to warm up the back of a human (e.g., going from upper back and progressing towards the glutes). In some instances, the walking compression technique can be performed prior to a subsequent coordinated body work (e.g., pin and stretch, mother hand, symmetric).

In some implementations, a first end effector of a first robotic arm (e.g., robotic arm 103A) can apply a first set of pressures to a first region of an object during a first time period. Additionally, a second end effector of a second robotic arm (e.g., robotic arm 103B) can apply a second set of pressures to a second region of the object different from the first region of the object during the second time period. The second time period can have no overlap with the first time period, or overlap partially with the first time period (e.g., overlap includes the end of the first time period but not the beginning of the first time period). Additionally, the first end effector can apply a third set of pressures to a third region of the object different from the first region of the object during a third time period subsequent to the first time period. The third time period can have no overlap with the second time period, or overlap partially with the second time period (e.g., overlap includes the end of the second time period but not the beginning of the second time period). Additionally, the second end effector can apply a fourth set of pressures to a fourth region of the object different than the second region during a fourth time period subsequent to the second time period. The fourth time period can have no overlap with the third time period, or overlap partially with the third time period (e.g., overlap includes the end of the third time period but not the beginning of the third time period). In some instances, the first and second end effectors make contact with the object to apply the first, second, third, and/or fourth sets of pressures via a region of the first and second end effector (e.g., region 304 in FIGS. 3A-3C).

In addition to the pin and stretch, mother hand, symmetric, and walking compression techniques, the robot system can be used to perform any other type of coordinated body work. For example, asymmetrical effleurage can be performed. In some implementations, a first end effector (e.g., from robotic arm 103A) can apply a first contacted motion across a first region of an object during a first period of time, and a second end effector (e.g., from robotic arm 103B) can apply a second contacted motion across a second region of the object that substantially mirrors the first region about a portion (e.g., spine, muscle, anatomical landmark) of the object during a second period of time different than (e.g., after) the first period of time. For example, a first end effector can make contact with and go down a left side of a spine. Thereafter, the second end effector can make contact with and go down a right side of the spine. Such a process can be repeated any number of times. In some instances, the first and second end effectors make contact with the object to apply the first and second contacted motions via a region of the first and second end effector (e.g., region 304 in FIGS. 3A-3C).

In some implementations, an erector stretch can be performed. In some implementations, a first end effector (e.g., from robotic arm 103A) applies a first pressure to a first location of an object during a range of time. During a first sub-range of time included in the range of time, a second end effector (e.g., from robotic arm 103B) applies a second pressure to a second location of the object. During a second sub-range of time included in the range of time, the second end effector applies a third pressure to a third location of the object that is closer to the first location than the second location is to the first location (i.e., the first location is closer to the third location than the first location is to the second location). The second sub-range of time can be after the first sub-range of time. In some instances, the first and second end effectors make contact with the object to apply the first, second, and third pressures via a region of the first and second end effector (e.g., region 304 in FIGS. 3A-3C). As an example, the first end effector can apply a pressure(s) to a human's upper back. During that time, the second end effector can apply a pressure(s) to the human's lower back, then apply a pressure(s) to the human's middle back. In some instances, the second sub-range of time can be before the first sub-range of time. For example, the first end effector can apply a pressure(s) to a human's upper back. During that time, the second end effector can apply a pressure(s) to the human's middle back, then apply a pressure(s) to the human's lower back.

In some implementations, an end effector (e.g., end effector 111) contacts a region of an object using a first portion of the end effector. Thereafter, the end effector contacts the region and/or a different region using a second portion of the end effector different than the first portion. For example, after the end effector has begun applying pressure to a portion of a body, the end effector can rotate and/or rub along the object such that a different portion of the end effector is making contact with the body. In some implementations, after the end effector is applying compression to a region of an object, the end effector can rotate while maintaining contact with the object. In some implementations, after the end effector is applying compression to a region of an object, the end effector can rotate without maintaining contact with the object. In some instances, the end effector makes contact with the object to rotate and/or rub via any region(s) of the end effector.

In some instances, a first end effector (e.g., from robotic arm 103A) and second end effector (e.g., from robotic arm 103B) can perform repeated stripping along a muscle of a body. For example, the first and second end effectors can strip along a right erector of a human, each end effector moving a predetermined length (e.g., approximately five inches) at a time and moving down the body to gradually traverse the right erector. In some instances, a first end effector performs a first contacted motion across a first region of an object. Thereafter, a second end effector performs a second contacted motion across a second region of the object different than the first region of the object, where a portion of the first region intersects with a portion of the first region. Such a process can be repeated any number of times (e.g., until a muscle has been stripped). In some instances, the first and second end effectors make contact with the object to perform the first contacted motion and the second contacted motion via a region of the first and second end effector (e.g., region 304 in FIGS. 3A-3C).

In some instances, a first end effector (e.g., from robotic arm 103A) and second end effector (e.g., from robotic arm 103B) can be used to perform synchronized rocking motions or oscillations to an object. Where the object is a human, such rocking and/or oscillations can improve blood flow and muscle relations. The rocking and/or oscillations can be in any direction, such as up and down and/or left to right. For example, a first end effector can apply a first force to an object in a first direction. Thereafter, the second end effector can apply a second force to the object in a second direction different than the first direction (e.g., opposite from the first direction; after the first end effector has stopped applying the first force). Such a process can be repeated any number of times. In some instances, the first and second end effectors make contact with the object to apply the first and second forces via a region of the first and second end effector (e.g., region 304 in FIGS. 3A-3C).

In some instances, a first end effector (e.g., from robotic arm 103A) and second end effector (e.g., from robotic arm 103B) can be used to perform tapotement. For example, the first end effector can make a first contacted motion at a first region of the object while a second end effector does not make contact with the object. Thereafter, the second end effector can make a second contacted motion at a second region of the object different from the first region of the object while the first end effector does not make contact with the object. Such a process can be repeated any number of times. In some instances, the first and second end effectors make contact with the object to make the first and second contacted motions via a region of the first and second end effector (e.g., region 304 in FIGS. 3A-3C).

In some implementations, a first end effector (e.g., from robotic arm 103A) and second end effector (e.g., from robotic arm 103B) can massage the glutes and/or legs (e.g., upper legs, calves, etc.) of a human. The first and second end effectors can make contact with the glutes and/or legs via a region of the first and second end effector (e.g., regions 305 and/or 306 in FIGS. 3A-3C). In some implementations, a first end effector and second end effector can massage the shoulders of a human. The first and second end effectors can make contact with the shoulders via a region (e.g., region 301 of FIGS. 3A-3C) of the first and second end effector.

In an embodiment, an apparatus comprises: a support structure (e.g. support structure 101) configured to support an object; a first robotic arm (e.g., robotic arm 103A) coupled to the support structure, the first robotic arm including a first end effector (e.g., end effector 111) having a first shape; a second robotic arm (e.g., robotic arm 103B) coupled to the support structure, the second robotic arm separate from the first robotic arm and having a second shape that mirrors the first shape when observed from a common perspective. Alternatively or in addition, the first shape may be both rotated and mirrored, relative to the second shape, when viewed from a common perspective. At least one of the first end effector or the second end effector may be asymmetric about at least one two-dimensional plane thereof; and at least one processor operatively coupled to the first robotic arm and the second robotic arm, the at least one processor configured to: perform coordinated body work (e.g., massage) of the object using the first robotic arm and the second robotic arm.

In some embodiments, an apparatus comprises a first robotic arm (e.g., robotic arm 103A) including a first end effector (e.g., end effector 111) having a portion with a first shape, and a second robotic arm (e.g., robotic arm 103B) separate from the first robotic arm and including a second end effector, the second end effector having a portion with a second shape that substantially mirrors the first shape when observed from a common perspective. For example, the portion of the first end effector with the first shape may occupy between about 80% and about 99%, or between about 50% and about 90%, or between about 25% and about 75%, or between about 50% and 100%, or between about 75% and 100% of the surface of the first end effector, and similarly, the portion of the second end effector with the second shape may occupy between about 80% and about 99%, or between about 50% and about 90%, or between about 25% and about 75%, or between about 50% and 100%, or between about 75% and 100% of the surface of the second end effector.

In some embodiments, an apparatus comprises (1) a first end effector (e.g., end effector 111) having a first surface with a first shape and a second surface with a second shape, and (2) a second end effector having a first surface with a third shape that mirrors the first shape of the first end effector when observed from a common perspective, and a second surface with a fourth shape. In some such implementations, during operation of the apparatus, the first surface of the first end effector and the first surface of the second end effector are in contact with a body, and the second surface of the first end effector and the second surface of the second end effector are not in contact with the body.

In some implementations, performing the coordinated body work includes: sending a first signal to cause the first end effector to apply a first pressure to a first location on the object during a predefined period of time; and sending a second signal to cause the second end effector to apply a second pressure to a second location on the object different than the first location and during the predefined period of time, such that at least a portion of the first pressure opposes at least a portion of the second pressure within a common plane.

In some implementations, performing the coordinated body work includes: sending a first signal to cause, during a period of time, the first end effector to perform a first contacted motion across a first region of the object while applying a first set of at least one pressure to the object; and sending a second signal to cause, during the period of time, the second end effector to perform a second contacted motion across a second region of the object while applying a second set of at least one pressure to the object, each pressure from the second set of at least one pressure being greater than an associated co-occurring pressure from the first set of pressures.

In some implementations, performing the coordinated body work includes: sending a first signal to cause, during a predefined period of time, the first end effector to perform a first contacted motion across a first region of the object; and sending a second signal to cause, during the predefined period of time, the second end effector to perform a second contacted motion across a second region of the object different than the first region of the object, the first contacted motion substantially mirroring the second contacted motion relative to a portion of the object.

In some implementations, performing the coordinated body work includes: causing the first end effector to apply a first set of pressures to a first region of the object during a first time period; causing the second end effector to apply a second set of pressures to a second region of the object different from the first region of the object, during a second time period that overlaps with the first time period; causing the first end effector to apply a third set of pressures to a third region of the object different from the first region of the object and during a third time period subsequent to the first time period; and causing the second end effector to apply a fourth set of pressures to a fourth region of the object different from the second region of the object and during a fourth time period subsequent to the second time period. In some implementations, when a maximum pressure value from the first set of pressures is applied to the first region of the object, and a second pressure value from the second set of pressures is applied to the second region of the object, the second pressure value being less than the maximum pressure value. In some implementations, when a maximum pressure value from the first set of pressures is applied to the first region of the object, the first end effector is maintained at a first position within the first region of the object, and when a minimum pressure value from the first set of pressures is applied to the first region of the object, the first end effector moves along the first region of the object.

In some implementations, performing the coordinated body work includes: sending a first signal to cause, during a first period of time, the first end effector to perform a first contacted motion across a first region of the object; and sending a second signal to cause, during a second period of time different than the first period of time, the second end effector to perform a second contacted motion across a second region of the object different than the first region of the object, the first region substantially mirroring the second region about a portion of the object.

In some implementations, performing the coordinated body work includes: sending a first signal to cause, during a range of time, the first end effector to apply a first pressure to a first location of the object; sending a second signal to cause, during a first sub-range of time included in the range of time, the second end effector to apply a second pressure to a second location of the object; and sending a third signal to cause, during a second sub-range of time included in the range of time different the first sub-range of time, the second end effector to apply a third pressure to a third location of the object, the third location being closer than the second location to the first location.

In some implementations, performing the coordinated body work includes: sending a first signal to cause, at a first time, the first end effector to contact a region of the object using a first portion of the first end effector; and sending a second signal to cause, at a second time different than the first time, the first end effector to contact the region of the object using a second portion of the first end effector different than the first portion.

In some implementations, performing the coordinated body work includes: causing the first end effector to apply compression to a region of the object at a first time; and subsequent to the first time, causing the first end effector to rotate while maintaining contact with the object.

In some implementations, the apparatus further includes: a third robotic arm coupled to the support structure and operatively coupled to the at least one processor, the third robotic arm being separate from the first robotic arm and the second robotic arm, the third robotic arm including a third end effector that is asymmetric about at least one two-dimensional plane that is perpendicular to an end effector plane of the third end effector. In some implementations, the apparatus further includes: a fourth robotic arm coupled to the support structure and operatively coupled to the at least one processor, the fourth robotic arm being separate from the first robotic arm and the second robotic arm, the fourth robotic arm including a fourth end effector that is asymmetric about at least one two-dimensional plane that is perpendicular to an end effector plane of the fourth end effector.

In some implementations, the support structure includes at least one track, and at least one of the first robotic arm or the second robotic arm is slidably coupled to the at least one track.

In some implementations, the first end effector is not symmetric about any two-dimensional plane that passes through a center of at least one first mounting flange associated with at least one of the first end effector or the first robotic arm, and the second end effector is not symmetric about any two-dimensional plane that passes through a center of at least one second mounting flange associated with at least one of the second end effector or the second robotic arm.

In some implementations, performing the coordinated body work includes: sending a first signal to cause, during a first period of time, the first end effector to perform a first contacted motion across a first region of the object; and sending a second signal to cause, during a second period of time after the first period of time, the second end effector to perform a second contacted motion across a second region of the object different than the first region of the object, a portion of the first region intersecting with a portion of the second region.

In some implementations, performing the coordinated body work includes: causing the first end effector to make a first contacted motion at a first region of the object during a first time period; causing the second end effector to not make contact with the object during the first period of time; causing the second end effector to make a second contacted motion at a second region of the object different from the first region of the object during a second time period after the first time period; causing the first end effector to not make contact with the object during the second period of time; causing the first end effector to make the first contacted motion at the first region of the object during a third time period after the second period of time; causing the second end effector to not make contact with the object during the third period of time; causing the second end effector to make the second contacted motion at the second region of the object during a fourth time period after the third period of time; and causing the first end effector to not make contact with the object during the fourth period of time.

In some implementations, performing the coordinated body work includes: causing the first end effector to apply a first force to the object in a first direction at a first time; causing the second end effector to apply a second force to the object in a second direction substantially opposite to the first direction at a second time after the first time; causing the first end effector to apply a third force to the object in the first direction at a third time after the second time; and causing the second end effector to apply a fourth force to the object in the second direction at a fourth time after the third time.

In an embodiment, a non-transitory, processor-readable medium stores code representing instructions executable by a processor to receive a signal representing an instruction to perform a massage; and send at least one signal to cause at least one of a first robotic arm (e.g., robotic arm 103A) of a robot system or a second robotic arm (e.g., robotic arm 103B) of the robot system to perform the massage on an object, the robot system including: a support structure (e.g., support structure 101); the first robotic arm, coupled to the support structure and including a first end effector having a first shape; and the second robotic arm coupled to the support structure, the second robotic arm separate from the first robotic arm and including a second end effector having a second shape that mirrors the first shape when observed from a common perspective. At least one of the first end effector or the second end effector is asymmetric about at least one two-dimensional plane that is perpendicular to an end effector plane of the at least one of the first end effector or the second end effector.

In some implementations, sending the at least one signal includes: sending a first signal to cause the first end effector to apply a first pressure to a first location on the object during a predefined period of time, and sending a second signal to cause the second end effector to apply a second pressure to a second location on the object different than the first location and during the predefined period of time, such that at least a portion of the first pressure opposes at least a portion of the second pressure within a common plane.

In some implementations, performing the massage includes: sending a first signal to cause, during a period of time, the first end effector to perform a first contacted motion across a first region of the object while applying a first set of pressures to the object; and sending a second signal to cause, during the period of time, the second end effector to perform a second contacted motion across a second region of the object while applying a second set of pressures to the object, each pressure from the second set of pressures being greater than an associated co-occurring pressure from the first set of pressures.

In some implementations, performing the massage includes: sending a first signal to cause, during a predefined period of time, the first end effector to perform a first contacted motion across a first region of the object; and sending a second signal to cause, during the predefined period of time, the second end effector to perform a second contacted motion across a second region of the object different than the first region of the object, the first contacted motion substantially mirroring the second contacted motion relative to a portion of the object.

In some implementations, performing the massage includes: causing the first end effector to apply a first set of pressures to a first region of the object during a first time period; causing the second end effector to apply a second set of pressures to a second region of the object different from the first region of the object, during a second time period that overlaps with the first time period; causing the first end effector to apply a third set of pressures to a third region of the object different from the first region of the object and during a third time period subsequent to the first time period; and causing the second end effector to apply a fourth set of pressures to a fourth region of the object different from the second region of the object and during a fourth time period subsequent to the second time period.

In some implementations, performing the massage includes: sending a first signal to cause, during a first period of time, the first end effector to perform a first contacted motion across a first region of the object; and sending a second signal to cause, during a second period of time different than the first period of time, the second end effector to perform a second contacted motion across a second region of the object different than the first region of the object, the first region substantially mirroring the second region about a portion of the object.

In some implementations, performing the massage includes: sending a first signal to cause, during a range of time, the first end effector to apply a first pressure to a first location of the object; sending a second signal to cause, during a first sub-range of time included in the range of time, the second end effector to apply a second pressure to a second location of the object; and sending a third signal to cause, during a second sub-range of time included in the range of time different the first sub-range of time, the second end effector to apply a third pressure to a third location of the object, the third location being closer than the second location to the first location.

In some implementations, performing the massage includes: sending a first signal to cause, at a first time, the first end effector to contact a region of the object using a first portion of the first end effector; and sending a second signal to cause, at a second time different than the first time, the first end effector to contact the region of the object using a second portion of the first end effector different than the first portion.

In some implementations, the robot system further includes: a third robotic arm coupled to the support structure and operatively coupled to the at least one processor, the third robotic arm being separate from the first robotic arm and the second robotic arm, the third robotic arm including a third end effector that is asymmetric about at least one two-dimensional plane that is perpendicular to an end effector plane of the third end effector.

In some implementations, the support structure includes at least one track, and at least one of the first robotic arm or the second robotic arm is slidably coupled to the at least one track.

In an embodiment, a method, comprises: receiving, via at least one processor of a robotic system (e.g., robot system 100), a signal representing an instruction to perform a massage; and sending, via the at least one processor, at least one signal to cause a robotic arm (e.g., robotic arm 103A) of the robot system to perform the massage on an object, the robot system including: a support structure (e.g., support structure 101); and the robotic arm, coupled to the support structure and including an end effector that is asymmetric about at least one two-dimensional plane that is perpendicular to an end effector plane of the end effector.

In some implementations, the robotic arm is a first robotic arm and the end effector is a first end effector, the robot system further including a second robotic arm coupled to the support structure, the second robotic arm including a second end effector that is asymmetric about at least one two-dimensional plane that is perpendicular to an end effector plane of the second end effector, and wherein the sending the at least one signal further causes the second robotic arm to perform the massage. In some implementations, performing the massage includes: sending a first signal to cause the first end effector to apply a first pressure to a first location on the object during a predefined period of time; and sending a second signal to cause the second end effector to apply a second pressure to a second location on the object different than the first location and during the predefined period of time, such that at least a portion of the first pressure opposes at least a portion of the second pressure within a common plane. In some implementations, performing the massage includes: sending a first signal to cause, during a period of time, the first end effector to perform a first contacted motion across a first region of the object while applying a first set of pressures to the object; and sending a second signal to cause, during the period of time, the second end effector to perform a second contacted motion across a second region of the object while applying a second set of pressures to the object, each pressure from the second set of pressures being greater than an associated co-occurring pressure from the first set of pressures. In some implementations, performing the massage includes: sending a first signal to cause, during a predefined period of time, the first end effector to perform a first contacted motion across a first region of the object; and sending a second signal to cause, during the predefined period of time, the second end effector to perform a second contacted motion across a second region of the object different than the first region of the object, the first contacted motion substantially mirroring the second contacted motion relative to a portion of the object. In some implementations, performing the massage includes: causing the first end effector to apply a first set of pressures to a first region of the object during a first time period; causing the second end effector to apply a second set of pressures to a second region of the object different from the first region of the object, during a second time period that overlaps with the first time period; causing the first end effector to apply a third set of pressures to a third region of the object different from the first region of the object and during a third time period subsequent to the first time period; and causing the second end effector to apply a fourth set of pressures to a fourth region of the object different from the second region of the object and during a fourth time period subsequent to the second time period. In some implementations, performing the massage includes: sending a first signal to cause, during a first period of time, the first end effector to perform a first contacted motion across a first region of the object; and sending a second signal to cause, during a second period of time different than the first period of time, the second end effector to perform a second contacted motion across a second region of the object different than the first region of the object, the first region substantially mirroring the second region about a portion of the object. In some implementations, performing the massage includes: sending a first signal to cause, during a range of time, the first end effector to apply a first pressure to a first location of the object; sending a second signal to cause, during a first sub-range of time included in the range of time, the second end effector to apply a second pressure to a second location of the object; and sending a third signal to cause, during a second sub-range of time included in the range of time different the first sub-range of time, the second end effector to apply a third pressure to a third location of the object, the third location being closer than the second location to the first location. In some implementations, performing the massage includes: sending a first signal to cause, at a first time, the first end effector to contact a region of the object using a first portion of the first end effector; and sending a second signal to cause, at a second time different than the first time, the first end effector to contact the region of the object using a second portion of the first end effector different than the first portion.

In some embodiments, an apparatus includes a support structure configured to support an object, a first robotic arm coupled to the support structure and including a first end effector, a second robotic arm coupled to the support structure, the second robotic arm separate from the first robotic arm and including a second end effector, and at least one processor operatively coupled to the first robotic arm and the second robotic arm. The at least one processor is configured to perform coordinated body work on the object using the first robotic arm and the second robotic arm. The coordinated body work includes sending a first signal to cause, during a predefined period of time, the first end effector to perform a first contacted motion across a first region of the object. The coordinated body work also includes sending a second signal to cause, during the predefined period of time, the second end effector to perform a second contacted motion across a second region of the object different than the first region of the object, the first contacted motion substantially mirroring the second contacted motion relative to a portion of the object.

In some implementations, at least one of the first end effector or the second end effector is asymmetric about at least one two-dimensional plane that is perpendicular to an end effector plane of the at least one of the first end effector or the second end effector.

In some implementations, the support structure includes at least one track, and at least one of the first robotic arm or the second robotic arm is slidably coupled to the at least one track.

In some implementations, at least one of: (1) the first end effector is not symmetric about any two-dimensional plane that passes through a center of at least one first mounting flange associated with at least one of the first end effector or the first robotic arm, or (2) the second end effector is not symmetric about any two-dimensional plane that passes through a center of at least one second mounting flange associated with at least one of the second end effector or the second robotic arm.

The modifications listed herein and other modifications can be made by those in the art without departing from the scope of the disclosure. Although subject matter has been described herein with reference to specific embodiments, the invention(s) is not limited to the above embodiments and the specific configurations shown in the drawings. For example, some components shown can be combined with each other as one embodiment, and/or a component can be divided into several subcomponents, and/or any other known or available component can be added. The processes are not limited to those shown in the examples. Those skilled in the art will appreciate that the invention(s) can be implemented in other ways without departing from the substantive features of the invention. For example, features and embodiments described above can be combined with and without each other. The present embodiments are therefore to be considered in all respects as illustrative and not restrictive. Other embodiments can be utilized and derived therefrom, such that structural and logical substitutions and changes can be made without departing from the scope of this disclosure. This Specification, therefore, is not to be taken in a limiting sense, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations and/or variations of various embodiments. Combinations of the above embodiments, and other embodiments not specifically described herein, are also contemplated, and will be apparent to those of ordinary skill in the art upon reviewing the above description.

The invention claimed is:

1. An apparatus, comprising:
   a support structure configured to support an object, the support structure comprising a track;
   a first robotic arm coupled to the track comprised in the support structure, the first robotic arm slidable along the track, and the first robotic arm including a first end effector comprising a first plurality of surfaces including a first surface having a first shape;
   a second robotic arm coupled to the support structure, the second robotic arm separate from the first robotic arm and having a second end effector comprising a second plurality of surfaces including a second surface with a second shape that mirrors the first shape when observed from a common perspective, at least one of the first end effector or the second end effector being asymmetric about at least one two-dimensional plane that is perpendicular to an end effector plane of the at least one of the first end effector or the second end effector; and
   at least one processor operatively coupled to the first robotic arm and the second robotic arm, the at least one processor configured to:
      perform coordinated body work on the object using the first robotic arm and the second robotic arm, wherein performing the coordinated body work comprises sending, via the at least one processor, at least one signal to cause the first end effector to make contact with the object via a surface in the first plurality of surfaces of the first end effector that has a shape that is usable for facilitating a type of the coordinated body work, wherein a representation of a trajectory of the first end effector is stored in a barycentric space, and wherein a stroke is mapped from cartesian coordinates to barycentric coordinates.

2. The apparatus of claim 1, wherein performing the coordinated body work includes:
   sending a first signal to cause the first end effector to apply a first pressure to a first location on the object during a predefined period of time; and
   sending a second signal to cause the second end effector to apply a second pressure to a second location on the object different than the first location and during the predefined period of time, such that at least a portion of the first pressure opposes at least a portion of the second pressure within a common plane.

3. The apparatus of claim 1, wherein performing the coordinated body work includes:
   sending a first signal to cause, during a period of time, the first end effector to perform a first contacted motion across a first region of the object while applying a first set of at least one pressure to the object; and
   sending a second signal to cause, during the period of time, the second end effector to perform a second contacted motion across a second region of the object while applying a second set of at least one pressure to the object, each pressure from the second set of at least one pressure being greater than an associated co-occurring pressure from the first set of at least one pressure.

4. The apparatus of claim 1, wherein performing the coordinated body work includes:
sending a first signal to cause, during a predefined period of time, the first end effector to perform a first contacted motion across a first region of the object; and
sending a second signal to cause, during the predefined period of time, the second end effector to perform a second contacted motion across a second region of the object different than the first region of the object, the first contacted motion substantially mirroring the second contacted motion relative to a portion of the object.

5. The apparatus of claim 1, wherein performing the coordinated body work includes:
sending a first signal to cause, at a first time, the first end effector to contact a region of the object using a first portion of the first end effector; and
sending a second signal to cause, at a second time different than the first time, the first end effector to contact the region of the object using a second portion of the first end effector different than the first portion.

6. The apparatus of claim 1, wherein performing the coordinated body work includes:
causing the first end effector to apply compression to a region of the object at a first time; and
subsequent to the first time, causing the first end effector to rotate while maintaining contact with the object.

7. The apparatus of claim 1, wherein the first end effector is not symmetric about any two-dimensional plane that passes through a center of at least one first mounting flange associated with at least one of the first end effector or the first robotic arm, and the second end effector is not symmetric about any two-dimensional plane that passes through a center of at least one second mounting flange associated with at least one of the second end effector or the second robotic arm.

8. The apparatus of claim 1, wherein performing the coordinated body work includes:
sending a first signal to cause, during a first period of time, the first end effector to perform a first contacted motion across a first region of the object; and
sending a second signal to cause, during a second period of time after the first period of time, the second end effector to perform a second contacted motion across a second region of the object, a portion of the first region intersecting with a portion of the second region.

9. The apparatus of claim 1, wherein performing the coordinated body work includes:
causing the first end effector to apply a first force to the object in a first direction at a first time;
causing the second end effector to apply a second force to the object in a second direction substantially opposite to the first direction at a second time after the first time;
causing the first end effector to apply a third force to the object in the first direction at a third time after the second time; and
causing the second end effector to apply a fourth force to the object in the second direction at a fourth time after the third time.

10. The apparatus of claim 1, wherein the mapping from cartesian coordinates to barycentric coordinates is performed using a body model of the object.

11. A non-transitory, processor-readable medium storing code representing instructions executable by a processor to:
receive a signal representing an instruction to perform a massage; and
send at least one signal to cause at least one of a first robotic arm of a robot system or a second robotic arm of the robot system to perform the massage on an object, the robot system including:
a support structure comprising a track;
the first robotic arm, coupled to the track comprised in the support structure, the first robotic arm slidable along the track, and the first robotic arm including a first end effector comprising a first plurality of surfaces including a first surface having a first shape; and
the second robotic arm coupled to the support structure, the second robotic arm separate from the first robotic arm and including a second end effector comprising a second plurality of surfaces including a second surface having a second shape that mirrors the first shape when observed from a common perspective;
at least one of the first end effector or the second end effector being asymmetric about at least one two-dimensional plane that is perpendicular to an end effector plane of the at least one of the first end effector or the second end effector; and
wherein sending the at least one signal causes the first end effector to make contact with the object via a surface in the first plurality of surfaces of the first end effector that has a shape that is usable for facilitating a type of the massage, wherein a representation of a trajectory of the first end effector is stored in a barycentric space, and wherein a stroke is mapped from cartesian coordinates to barycentric coordinates.

12. The non-transitory, processor-readable medium of claim 11, wherein sending the at least one signal includes:
sending a first signal to cause the first end effector to apply a first pressure to a first location on the object during a predefined period of time; and
sending a second signal to cause the second end effector to apply a second pressure to a second location on the object different than the first location and during the predefined period of time, such that at least a portion of the first pressure opposes at least a portion of the second pressure within a common plane.

13. The non-transitory, processor-readable medium of claim 11, wherein performing the massage includes:
sending a first signal to cause, during a period of time, the first end effector to perform a first contacted motion across a first region of the object while applying a first set of pressures to the object; and
sending a second signal to cause, during the period of time, the second end effector to perform a second contacted motion across a second region of the object while applying a second set of pressures to the object, each pressure from the second set of pressures being greater than an associated co-occurring pressure from the first set of pressures.

14. The non-transitory, processor-readable medium of claim 11, wherein performing the massage includes:
sending a first signal to cause, during a predefined period of time, the first end effector to perform a first contacted motion across a first region of the object; and
sending a second signal to cause, during the predefined period of time, the second end effector to perform a second contacted motion across a second region of the object different than the first region of the object, the first contacted motion substantially mirroring the second contacted motion relative to a portion of the object.

15. The non-transitory, processor-readable medium of claim 11, wherein performing the massage includes:
causing the first end effector to apply a first set of pressures to a first region of the object during a first time period;
causing the second end effector to apply a second set of pressures to a second region of the object different from the first region of the object, during a second time period that overlaps with the first time period;
causing the first end effector to apply a third set of pressures to a third region of the object different from the first region of the object and during a third time period subsequent to the first time period; and
causing the second end effector to apply a fourth set of pressures to a fourth region of the object different from the second region of the object and during a fourth time period subsequent to the second time period.

16. The non-transitory, processor-readable medium of claim 11, wherein performing the massage includes:
sending a first signal to cause, during a first period of time, the first end effector to perform a first contacted motion across a first region of the object; and
sending a second signal to cause, during a second period of time different than the first period of time, the second end effector to perform a second contacted motion across a second region of the object different than the first region of the object, the first region substantially mirroring the second region about a portion of the object.

17. The non-transitory, processor-readable medium of claim 11, wherein performing the massage includes:
sending a first signal to cause, during a range of time, the first end effector to apply a first pressure to a first location of the object;
sending a second signal to cause, during a first sub-range of time included in the range of time, the second end effector to apply a second pressure to a second location of the object; and
sending a third signal to cause, during a second sub-range of time included in the range of time different from the first sub-range of time, the second end effector to apply a third pressure to a third location of the object, the third location being closer than the second location to the first location.

18. The non-transitory, processor-readable medium of claim 11, wherein performing the massage includes:
sending a first signal to cause, at a first time, the first end effector to contact a region of the object using a first portion of the first end effector; and
sending a second signal to cause, at a second time different than the first time, the first end effector to contact the region of the object using a second portion of the first end effector different than the first portion.

19. A method, comprising:
receiving, via at least one processor of a robot system, a signal representing an instruction to perform a massage; and
sending, via the at least one processor, at least one signal to cause a robotic arm of the robot system to perform the massage on an object, the robot system including:
a support structure comprising a track; and
the robotic arm, coupled to the track comprised in the support structure, the robotic arm slidable along the track, the robotic arm including an end effector that is asymmetric about at least one two-dimensional plane that is perpendicular to an end effector plane of the end effector, and the end effector comprising a plurality of surfaces including a first surface having a first shape;
wherein sending the at least one signal causes the end effector to make contact with the object via a surface in the plurality of surfaces of the end effector that has a shape that is usable for facilitating a type of the massage, wherein a representation of a trajectory of the end effector is stored in a barycentric space, and wherein a stroke is mapped from cartesian coordinates to barycentric coordinates.

20. The method of claim 19, wherein the robotic arm is a first robotic arm and the end effector is a first end effector, the robot system further including a second robotic arm coupled to the support structure, the second robotic arm including a second end effector that is asymmetric about at least one two-dimensional plane that is perpendicular to an end effector plane of the second end effector, and wherein the sending the at least one signal further causes the second robotic arm to perform the massage.

21. The method of claim 20, wherein performing the massage includes:
sending a first signal to cause the first end effector to apply a first pressure to a first location on the object during a predefined period of time; and
sending a second signal to cause the second end effector to apply a second pressure to a second location on the object different than the first location and during the predefined period of time, such that at least a portion of the first pressure opposes at least a portion of the second pressure within a common plane.

22. The method of claim 20, wherein performing the massage includes:
sending a first signal to cause, during a period of time, the first end effector to perform a first contacted motion across a first region of the object while applying a first set of pressures to the object; and
sending a second signal to cause, during the period of time, the second end effector to perform a second contacted motion across a second region of the object while applying a second set of pressures to the object, each pressure from the second set of pressures being greater than an associated co-occurring pressure from the first set of pressures.

23. The method of claim 20, wherein performing the massage includes:
sending a first signal to cause, during a predefined period of time, the first end effector to perform a first contacted motion across a first region of the object; and
sending a second signal to cause, during the predefined period of time, the second end effector to perform a second contacted motion across a second region of the object different than the first region of the object, the first contacted motion substantially mirroring the second contacted motion relative to a portion of the object.

24. The method of claim 20, wherein performing the massage includes:
causing the first end effector to apply a first set of pressures to a first region of the object during a first time period;
causing the second end effector to apply a second set of pressures to a second region of the object different from the first region of the object, during a second time period that overlaps with the first time period;

causing the first end effector to apply a third set of pressures to a third region of the object different from the first region of the object and during a third time period subsequent to the first time period; and causing the second end effector to apply a fourth set of pressures to a fourth region of the object different from the second region of the object and during a fourth time period subsequent to the second time period.

25. The method of claim 20, wherein performing the massage includes:

sending a first signal to cause, during a first period of time, the first end effector to perform a first contacted motion across a first region of the object;

sending a second signal to cause, during a second period of time different than the first period of time, the second end effector to perform a second contacted motion across a second region of the object different than the first region of the object, the first region substantially mirroring the second region about a portion of the object.

26. An apparatus, comprising:

a support structure configured to support an object, the support structure comprising a track;

a first robotic arm coupled to the track comprised in the support structure, the first robotic arm slidable along the track, and the first robotic arm including a first end effector comprising a first plurality of surfaces including a first surface having a first shape;

a second robotic arm coupled to the support structure, the second robotic arm separate from the first robotic arm and including a second end effector; and at least one processor operatively coupled to the first robotic arm and the second robotic arm, the at least one processor configured to:

perform coordinated body work on the object using the first robotic arm and the second robotic arm, the coordinated body work including:

sending a first signal to cause, during a predefined period of time, the first end effector to perform a first contacted motion across a first region of the object via a surface in the first plurality of surfaces of the first end effector that has a shape that is usable for facilitating a type of the coordinated body work, wherein a representation of a trajectory of the first end effector is stored in a barycentric space, and wherein a stroke is mapped from cartesian coordinates to barycentric coordinates; and sending a second signal to cause, during the predefined period of time, the second end effector to perform a second contacted motion across a second region of the object different than the first region of the object, the first contacted motion substantially mirroring the second contacted motion relative to a portion of the object.

27. The apparatus of claim 26, wherein at least one of the first end effector or the second end effector is asymmetric about at least one two-dimensional plane that is perpendicular to an end effector plane of the at least one of the first end effector or the second end effector.

28. The apparatus of claim 26, wherein at least one of:

the first end effector is not symmetric about any two-dimensional plane that passes through a center of at least one first mounting flange associated with at least one of the first end effector or the first robotic arm, or the second end effector is not symmetric about any two-dimensional plane that passes through a center of at least one second mounting flange associated with at least one of the second end effector or the second robotic arm.

* * * * *